G. A. JUHLIN.
EXCITING SYSTEM FOR BOOSTER INTERPOLE ROTARY CONVERTERS.
APPLICATION FILED OCT. 21, 1916.
Patented Dec. 2, 1919.
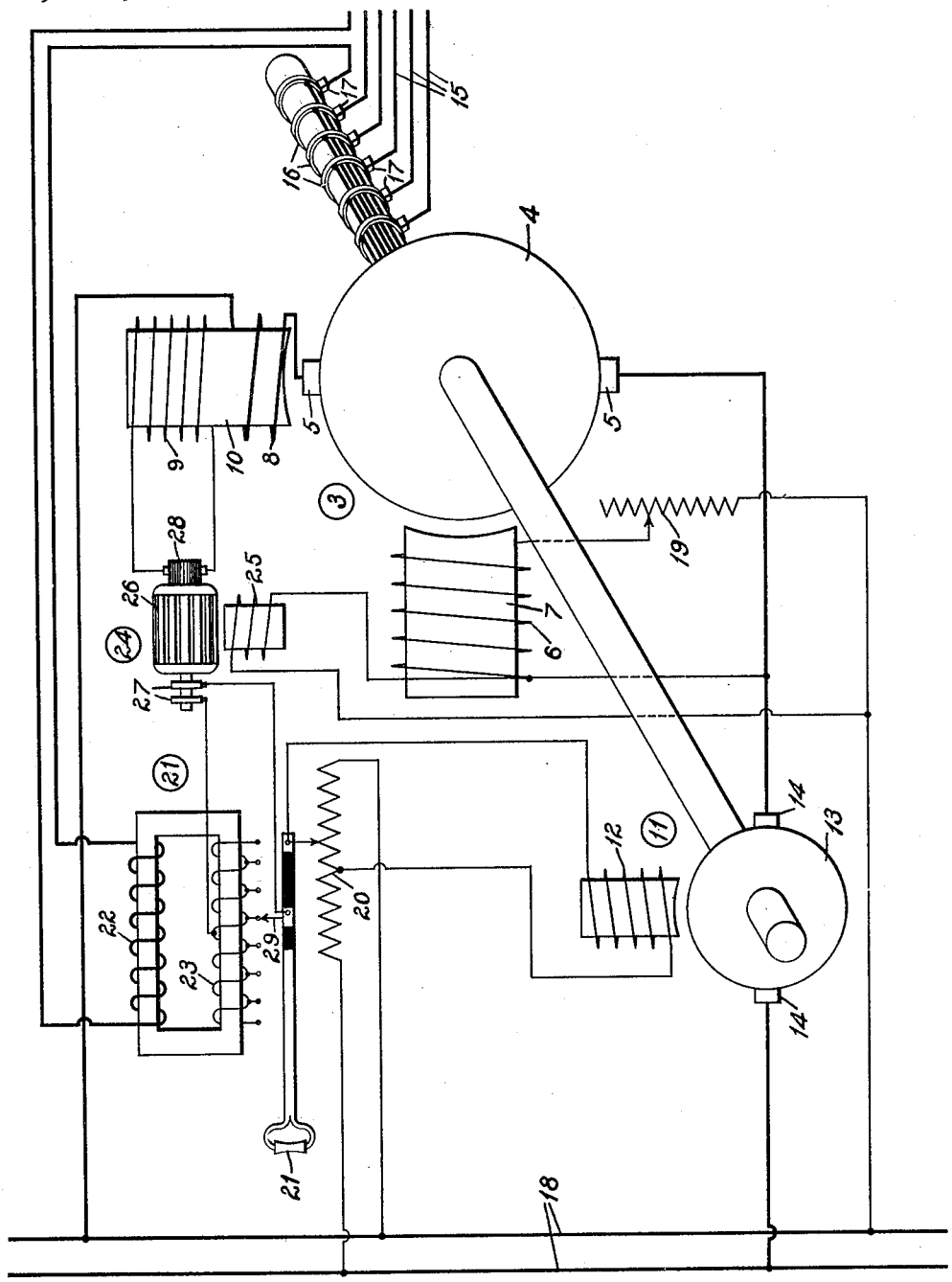
WITNESSES:
R. J. Fitzgerald.
D. C. Davis.
INVENTOR
Gustaf Adolf Juhlin.
BY
Wesley G. Carr
ATTORNEY

UNITED STATES PATENT OFFICE.

GUSTAF ADOLF JUHLIN, OF SALE, ENGLAND, ASSIGNOR TO WESTINGHOUSE ELECTRIC AND MANUFACTURING COMPANY, A CORPORATION OF PENNSYLVANIA.

EXCITING SYSTEM FOR BOOSTER INTERPOLE ROTARY CONVERTERS.

1,323,288. Specification of Letters Patent. Patented Dec. 2, 1919.

Application filed October 21, 1916. Serial No. 126,887.

*To all whom it may concern:*

Be it known that I, GUSTAF ADOLF JUHLIN, a subject of the King of Great Britain, and a resident of Sale, in the county of Chester, England, have invented a new and useful Improvement in Exciting Systems for Booster Interpole Rotary Converters, of which the following is a specification.

My invention relates to systems of excitation for rotary converters of the booster interpole type and similar apparatus, and it has for its object to provide a system whereby the interpole of a machine of the character designated may be so excited, under all conditions of load, that substantially sparkless commutation shall be obtained.

In the accompanying drawings, the figure is a diagrammatic view of a direct-current booster interpole rotary converter, together with associated supply, load and exciting circuits and associated apparatus, constructed in accordance with a preferred form of my invention.

It is a well-known fact that, in the operation of a rotary converter of the booster type, the booster machine acts as a generator when boosting, being driven by the armature of the rotary converter acting as a motor. In like manner, during bucking operation, the booster machine acts as a motor and tends to drive the armature of the rotary converter as a generator.

It is further well-known that the net or average armature reaction around the commutator of a rotary converter is a motor reaction. This is obvious from a consideration of the fact that, in a frictionless machine, the direct-current and alternating-current reactions would tend to be equal and opposite; but friction, windage, and iron and copper losses must be supplied by the alternating-current supply and, therefore, the alternating-current reaction tends to slightly exceed the direct-current reaction, producing the resultant motor reaction, as described.

Careful investigation, however, has disclosed the fact that the reaction under the brushes of the commutator of a rotary converter is a generator reaction, as fully discussed in an article by B. G. Lamme and F. D. Newbury, entitled "Interpoles in synchronous converters" appearing on page 1624 *et seq.* of the *Transactions of the American Institute of Electrical Engineers for 1910* (Part II).

Taking into account all of the above-mentioned factors, it will be noted that, during bucking operation, the effect of the generator action set up in the rotary-converter armature by the booster machine is added to the normal generator reaction under the brushes producing a strong generator reaction in the commutating zone. On the other hand, during boosting operation, the motor reaction produced in the rotary-converter armature by the booster machine tends to neutralize the normal generator reaction under the brushes and may even reverse the same, producing a motor reaction in the commutating zone.

In attempting to neutralize the armature reaction in the commutating zone by means of interpoles, it is necessary to so excite said interpoles as to take into account all of the above-mentioned factors, that is to say, the interpole should be excited jointly in accordance with the load of the rotary converter that is effective in producing the normal generator reaction under the brushes and in accordance with the energy conversion in the booster machine in order to compensate for the additional motor or generator field produced in the commutating zone by the booster machine. As I shall use the above term "energy conversion" in connection with the booster machine quite frequently in the disclosure and claim of this application, a word in explanation thereof is fitting. As before pointed out, during boosting operation, the booster machine operates as a generator, converting mechanical energy supplied thereto by the mechanical drive into electrical energy, and, conversely, during bucking operation, the booster machine operates as a motor, converting electrical energy supplied thereto from the system into mechanical energy which is returned to the system through the shaft of the booster machine and the driving mechanism. Thus, the term "energy conversion" covers broadly the activity of the booster machine during either the boosting or the bucking operation.

Referring to the drawing for a more detailed understanding of my invention, I show a main rotary converter at 3, said machine comprising an armature 4 provided with a commutator upon which bear brushes 5—5 and further comprising a main or exciting field winding 6 mounted upon a pole piece 7 and commutating or interpole field windings 8 and 9 mounted upon a suitable interpole or interpoles 10.

A booster machine 11 of the direct-current type is mounted upon the shaft of the converter 3 and comprises an exciting field winding 12 and an armature 13 provided with brushes 14—14.

Energy for the operation of the system is derived from suitable alternating-current mains 15—15, and is introduced into the armature 4 through suitable slip rings 16—16 and brushes 17—17. Direct-current energy derived from the armature 4 flows through the brushes 5—5 to suitable direct-current mains 18—18, said energy flowing through the armature 13 of the booster machine, where it is suitably altered in voltage for the specific conditions of operation.

The exciting field winding 6 of the main rotary converter is excited from the mains 18 or from any other direct-current source through an adjustable resistor 19.

The interpole field winding 8 is included in the load circuit of the main rotary converter and is, therefore, energized in accordance with the main-load current.

The exciting field winding 12 of the booster machine is excited from the mains 18—18, through an adjustable and reversible resistor 20, the setting of which may be changed by a suitable handle 21 or by equivalent means, such, for example, as a plurality of unit switches operated either electro-mechanically or pneumatically from an appropriate controller. By reversing the direction of current flow through the field winding 12 by the adjustment of the resistor 20, the machine 11 may be changed from boosting to bucking or vice versa, as is well understood in the art.

For the energization of the interpole field winding 9, special apparatus is provided to derive excitation in accordance with the energy conversion of the machine 11, as follows. An auxiliary transformer 21 is provided and includes a primary winding 22 and a secondary winding 23. The primary winding 22 is energized in accordance with the load current of the rotary converter and, consequently, of the booster machine, by direct series connection in one of the alternating-current mains 15, as shown, or, if desired, by an appropriate current transformer. An auxiliary rotary converter 24 is provided and comprises an exciting field winding 25 and an armature 26 provided with slip rings 27 and a commutator 28. The field winding 25 is energized from any suitable source of direct current. The slip rings 27 are connected between substantially the mid point of the secondary winding 23 of the transformer 21 and a movable tap member 29 which is adjustable over the entire length of the secondary winding 23 and is mounted to be moved in consonance with the tap of the resistor 20 by the handle 21. The brushes of the commutator 28 are connected to the terminals of the interpole field winding 9.

Having thus described the arrangement of a system embodying my invention, the operation is as follows:

Assuming the booster rotary converter to be operating in the normal manner, deriving energy from the alternating-current mains 15 and supplying said energy to the direct-current mains 18, the excitation of the interpole field winding 8 varies substantially with the load current of the rotary converter and, therefore, serves to closely compensate for the normal generator reaction under the brushes 5—5. The current flowing in the primary winding 22 of the transformer 21 varies with the load current of the converter and, therefore, the current derived from the secondary winding 23 and supplied to the auxiliary rotary converter 24 varies with the load current of the booster machine. The transformation ratio of the transformer 21 varies with the setting of the resistor 20, and therefore, varies in accordance with the applied voltage of the booster field winding 12, and, therefore, in accordance with the voltage of the booster machine 11 when the latter is well below saturation. Thus, the voltage and current supplied to the auxiliary rotary converter vary in accordance with the voltage and current of the booster machine, respectively, and, therefore, the direct-current output of the auxiliary rotary converter varies with the product of these factors, or, in other words, with the energy conversion of the booster machine. The interpole field winding 9 is, therefore, excited in accordance with the booster energy conversion and serves to compensate for the additional armature reaction under the brushes 5 occasioned by the mechanical connection between the armature of the main rotary converter and the armature of the booster machine.

It will be observed that, as the tap member 29 passes the mid point of the secondary winding 23, the phase of the electromotive force supplied to the auxiliary rotary converter 24 is shifted through 180°, but the excitation of the field winding 25 of the auxiliary rotary converter is unchanged. Therefore, under these conditions, the polarity of the brushes on the commutator 28 is reversed, reversing the direction of current flow through the interpole field winding 9. By suitable arrangement of the connections, the interpole field winding 9 is thus made to assist the interpole field winding 8 during bucking operation to provide a strong compensating field at the brushes 5, as is necessary to overcome the relatively strong armature reaction during boosting operation. In like manner, during boosting operation, the interpole field winding 9 is caused to oppose the interpole field winding 8, thus much weakening the compensating field provided at the brushes 5 and even reversing said compensating field when the boosting operation is carried to such a degree that motor reaction predominates under the brushes.

While I have shown my invention in a preferred form, it will be obvious to those skilled in the art that it is susceptible of various minor changes and modifications without departing from the spirit thereof and I desire, therefore, that only such limitations shall be placed thereupon as are imposed by the prior art or as are set forth in the appended claim.

I claim as my invention:

The combination with a main rotary converter of the booster type and provided with a commutating field winding, of a reversing rheostat for regulating the excitation of the booster in direction and in magnitude, and exciting means for said commutating winding of said main converter comprising an auxiliary rotary converter having its direct-current terminals connected to an interpole field winding, a transformer having an adjustable ratio of transformation, connections from the secondary terminals of said transformer to the alternating-current terminals of said auxiliary rotary converter, connections for energizing the primary winding of said transformer in accordance with the alternating load current, and means for adjusting the ratio of transformation of said transformer in consonance with said booster-regulating resistor, whereby said auxiliary rotary converter is energized in accordance with the product of the booster voltage and current.

In testimony whereof, I have hereunto subscribed my name this twenty-seventh day of September, 1916.

GUSTAF ADOLF JUHLIN.